United States Patent

Staudte

[15] 3,683,213

[45] Aug. 8, 1972

[54] MICRORESONATOR OF TUNING FORK CONFIGURATION

[72] Inventor: Juergen H. Staudte, Anaheim, Calif.

[73] Assignee: Statek Corporation, Orange, Calif.

[22] Filed: March 9, 1971

[21] Appl. No.: 122,313

[52] U.S. Cl. ....................310/9.6, 58/23 TF, 310/8.1, 310/8.2, 310/9.1, 310/9.5, 310/9.8, 310/21, 310/25, 333/72

[51] Int. Cl. ....................H01v 7/00

[58] Field of Search ....................310/8–8.3, 8.5, 310/8.7, 9.1, 9.4, 9.5, 9.6, 25, 21; 333/72; 58/23 TF; 331/116

[56] References Cited

UNITED STATES PATENTS

| | | | |
|---|---|---|---|
| 2,081,405 | 5/1937 | Mason | 310/9.1 X |
| 3,128,397 | 4/1964 | Shinada et al. | 333/72 X |
| 3,131,320 | 4/1964 | Shinada et al. | 310/9.6 |
| 3,437,850 | 4/1969 | Bunger | 310/9.6 |
| 2,247,960 | 7/1941 | Michaels | 58/23 TF X |
| 3,480,809 | 11/1969 | Grib | 58/23 TF X |
| 3,581,130 | 5/1971 | Grib | 58/23 TF |
| 3,559,100 | 1/1971 | Grib | 331/116 |
| 2,666,196 | 1/1954 | Kinsley et al. | 310/8.2 UX |

*Primary Examiner*—J. D. Miller
*Assistant Examiner*—Mark O. Budd
*Attorney*—Flam and Flam and Howard A. Silber

[57] ABSTRACT

A piezoelectric or ferroelectric microresonator of tuning fork configuration has an overall length of from about 100 mils to 500 mils, and a width of from about 15 mils to about 50 mils. In a typical embodiment, the microresonator includes a thin film electrode extending across the bottom surface of both tines, and on the top surface, a first set of electrodes extending along the outer tine edges and a second set of electrodes extending along the inner tine edges adjacent the tuning fork slot. The microresonator stem portion may be attached to a substrate by means of a eutectic pedestal or other mounting. Metal film weights at the tine ends may be used for adjusting the frequency of the microresonator, and the tines themselves may be tapered for improved temperature coefficient characteristics. Various other microresonator configurations are disclosed, as is a method for fabricating the tuning forks microlithographically.

35 Claims, 11 Drawing Figures

PATENTED AUG 8 1972

3,683,213

SHEET 1 OF 2

INVENTOR.
JUERGEN H. STAUDTE
BY
Hinderstein & Silber
ATTORNEYS

INVENTOR.
JUERGEN H. STAUDTE
BY
Hindenstein & Silber
ATTORNEYS

MICRORESONATOR OF TUNING FORK CONFIGURATION

BACKGROUND OF THE INVENTION

1. Field of the Invention.

The present invention relates to tuning fork microresonators, and particularly, to microresonators of sufficiently small size as to facilitate their utilization in wrist watches and/or in conjunction with microelectronic circuitry.

2. Description of the Prior Art.

Many applications exist for resonators of size commensurate with that of microelectronic circuitry. For example, such a microresonator could be used as a highly stable frequency source in an oscillator, as a high Q filter for tone telemetry, or as a transducer. A particularly important commercial application is as a time standard in a men's or ladies' wrist watch.

Some microresonators have been available in the past. One such prior art device incorporates an electrostatically driven, cantilevered mechanical beam attached at one end to a microelectronic substrate. When flexed in the clamped-free mode, the cantilevered beam modulates the source-to-drain current of a field effect transistor fabricated in the substrate beneath the beam. Operation in the clamped-free mode has inherently low Q because of energy loss through the clamped boundary, and the cantilevered beam design does not lend itself to filter or transducer type applications.

Another approach of the prior art is to utilize a piezoelectric beam adapted to vibrate in the free-free flexure mode, and supported by arms extending perpendicularly from nodal points on the beam. This approach provides a device having inherently high Q, reproducible frequency characteristics.

None of the prior art microresonators exhibit the combined characteristics of low temperature coefficient, high Q and frequency stability, ease of fabrication and simplicity of mounting with minimal energy loss to the supporting substrate. The present invention overcomes these and other shortcomings of the prior art by providing microresonators of tuning fork configuration which exhibit excellent frequency stability, high Q, very low temperature coefficients, and which can be supported easily at the stem end with minimum energy loss. Provision also is made for adjusting the tuning fork to exactly a desired resonant frequency. The inventive microresonator is particularly well adapted for use as a wrist watch time standard, or for other resonant circuit, filtering or transducer applications in conjunction with microelectronic circuitry.

SUMMARY OF THE INVENTION

In accordance with the present invention, there is provided a piezoelectric or ferroelectric microresonator of tuning fork configuration. Preferably the microresonator is fabricated microlithographically so as to have an overall length in the range of from about 100 mils to 500 mils, and a width in the range of from about 15 mils to 50 mils. The microresonator may be formed of quartz or like material, and typically has a thickness of less than about 3 mils.

Appropriate thin film electrodes are provided on the tuning fork tines. Thus, on the bottom surface of the microresonator is an electrode which may extend over substantially the entire width of both tines, and which may be grounded or electrically floating. On the top surface of the microresonator, along the tine edges, there typically are provided at least two electrodes configured to induce lateral stress in response to an applied electric field.

To permit exact adjustment of the microresonator frequency to a desired value, thick film metal weights may be provided near the tine free ends. The mass of these thick film weights may be trimmed, for example by using a laser to evaporate excess metal, to obtain the desired frequency. Typically, the film weights are on the order of 1 micron thick.

The microresonator may be mounted by attaching the tuning fork stem to a pedestal. Since a nodal line exists along the center of the stem, little or no energy is lost through the mounting. The pedestal may be formed eutectically; alternatively adhesive bonding or other techniques can be used to mount the device. The shape and/or length of the tuning fork stem may be configured to control the Q of the fork.

The outer edges of the tuning fork tines may be tapered, and the microresonator appropriately dimensioned as described herein, so as to obtain essentially zero temperature coefficient.

Thus it is an object of the present invention to provide novel microresonators of tuning fork configuration, characterized by small size, controllable frequency, Q and temperature coefficient, and which can be pedestal mounted with minimum energy loss. The microresonators can be fabricated microlithographically, and employ thin film electrodes and metal film weights for frequency control.

BRIEF DESCRIPTION OF THE DRAWINGS

Detailed description of the invention will made with reference to the accompanying drawings wherein like numerals designate like parts in the several figures. These drawings are greatly enlarged, and unless described as diagrammatic or unless otherwise indicated, are to scale.

DESCRIPTION OF THE PREFERRED EMBODIMENTS

The following detailed description of the best presently contemplated modes of carrying out the invention. This description is not to be taken in a limiting sense but is made merely for the purpose of illustrating the general principles of the invention since the scope of the invention is best defined by the appended claims.

Structural and operational characteristics attributed to forms of the invention first described shall also be attributed to forms later described unless such characteristics are obviously inapplicable or unless specific exception is made.

Figure 1:
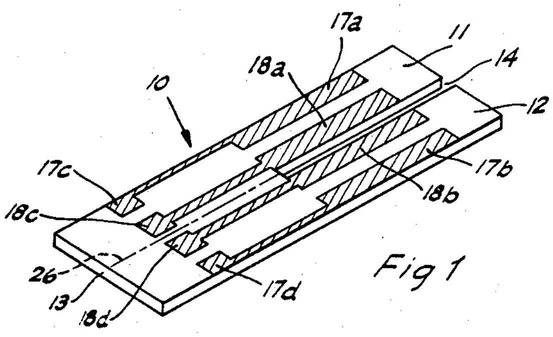
FIG. 1 is a perspective view showing the top surface.
Figure 1A:
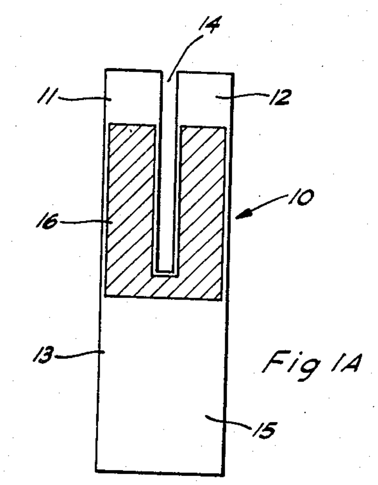
FIG. 1A is an elevation view showing the bottom surface of a typical microresonator in accordance with the present invention.

Referring now to the drawings, there are shown various tuning fork microresonators in accordance with the present invention. Typical of these is the microresonator 10 (FIGS. 1 and 1A), which like the other embodiments is very small in size, having an overall length of from about 100 mils to 500 mils, an overall width of from about 15 mils to 50 mils, and a thickness of less than about 3 mils. Because of their small size, the microresonators are useful as frequency standards, filters or transducers, in conjunction with microelectronic circuitry, and are particularly well suited for use as the time standard in a wrist watch.

Microresonator 10 typically may be fabricated of quartz, although any other piezoelectric or ferroelectric material such as a lead zirconate titanate (PZT) may be used. As evident in FIGS. 1 and 1A, microresonator 10 includes a pair of tines 11, 12 extending from the tuning fork stem 13 and separated by a narrow slot 14 having a width in the range of from about 1 mil to 5 mils. Preferably, the stem 13 length is at least three times the width of either tine 11, 12.

Disposed on the bottom or reverse surface 15 of microresonator 10 is a thin film electrode 16 extending substantially across both tines 11, 12. On the top or obverse surface (FIG. 1) of microresonator 10, a first thin film electrode *17a* is disposed along the outer edge of tine 11, and a corresponding thin film electrode *17b* is disposed along the outer edge of tine 12. Another pair of thin film electrodes *18a*, *18b* are provided along the respective inner edges of tines 11, 12 adjacent slot 14. Electrical connection to electrodes *17a*, *17b* may be facilitated by ultrasonically or otherwise bonding wires (not shown) to the pads *17c*, *17d* provided for this purpose. Similarly, electrodes *18a*, *18b* include electrical connection pads *18c* and *18d*.

Figure 2:
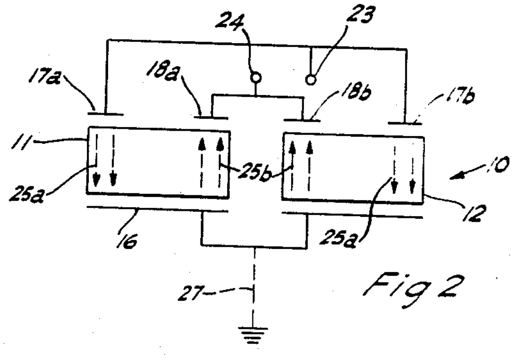
FIG. 2 is a diagrammatic view of an electric field pattern which might be produced within the tines of the microresonator of FIG. 1.

Tuning fork 10 may be excited by applying an electric field across appropriate ones of the electrodes on the microresonator. For example (FIG. 2), electrodes *17a* and *17b* both may be connected to a first terminal 23, and electrodes *18a*, *18b* both connected to a second terminal 24 of the driving signal source. With bottom electrode 16 floating, an electric field illustrated by arrows *25a*, *25b* may be produced within tines 11, 12, resulting in lateral stress which causes the tines to deform either toward or away from each other. If the driving signal is related to the resonant frequency, microresonator 10 will oscillate in a tuning fork mode, with a mechanical node occuring along the line 26 (shown in phantom in FIG. 1) of stem 13.

Note that the reverse surface electrode 16 may be grounded (as shown in phantom at 27 in FIG. 2), and microresonator 10 used as a three terminal device. In this instance, a driving or input signal may be applied, e.g., between ground 27 and terminal 24, and an output signal derived between ground 27 and terminal 23. The output signal will be in phase with the input, thus permitting microresonator 10 to perform a transformer function. Alternatively, if separate, electrically isolated electrodes are used on the reverse surface 15 of each tine 11, 12, the driving signal may be applied only between electrodes *17a* and *18a*. A separate output signal then may be derived across the other set of electrodes *17b* and *18b*.

Figure 3B:
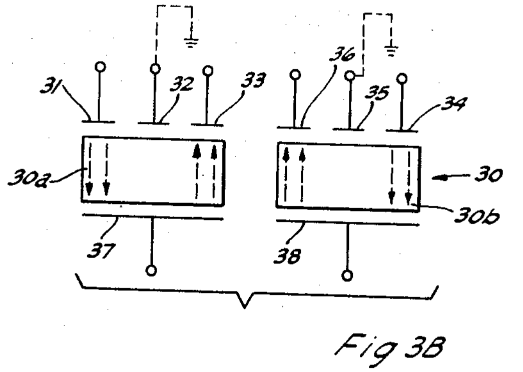
FIG. 3B is a diagrammatic transverse view of another microresonator embodiment.
Figure 3A:
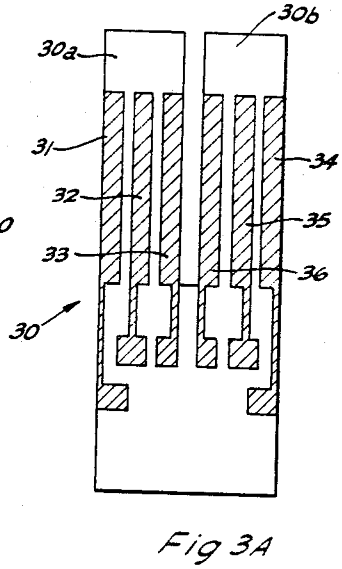
FIG. 3A is a top elevation view.

Various other microresonator electrode configurations may be employed. For example, FIGS. 3A and 3B show a microresonator 30 having on the obverse surface of one tine *30a* three parallel electrodes 31, 32, 33 and on the other tine *30b* three similar electrodes 34, 35, 36. The underside of each tine *30a*, *30b* is provided with a separate electrode 37, 38. Electrodes 31 through 38 may be variously connected for different applications, including but not limited to the configurations discussed in conjunction with FIGS. 2, 8 and 9. Moreover, central electrodes 32 and 35 may be grounded as shown in phantom in FIG. 3B, to reduce the effective capacitance and to provide shielding between the inner and outer edge electrodes 31, 33 and 34, 36 on each tine.

Figure 4:
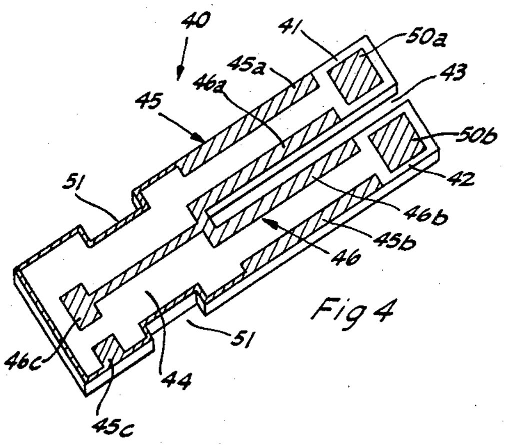
FIG. 4 is a perspective view showing the top surface.
Figure 4A:
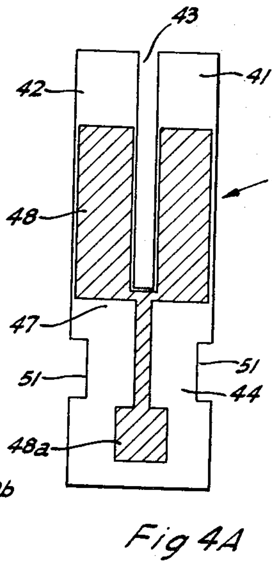
FIG. 4A is an elevation view showing the bottom surface of yet another microresonator in accordance with the present invention.

A particularly useful microresonator embodiment 40 is shown in FIGS. 4 and 4A. Tuning fork 40 includes tines 41, 42 separated by a slot 43, and having a stem section 44. The obverse surface of microresonator 40 is provided with a first generally U-shaped thin film electrode 45 including sections *45a*, *45b* extending along the outer edges of respective tines 41, 42. Electrode 45 also includes a pad *45c* for attachment of an electrical connection wire. A second, generally U-shaped electrode 46 includes sections *46a*, *46b* extending along the inner edge of respective tines 41, 42 adjacent slot 43. Electrode 46 also is provided with a pad *46c*. The bottom or reverse surface 47 of microresonator 40 is provided with an electrode 48 extending across both tines 41, 42 and including a pad *48a* which may be situated in the center of the stem section 44.

Provided on the upper surface of microresonator 40, adjacent the free ends of the tines 41, 42 are a respective pair of metal film weights *50a* and *50b*. Since the resonant frequency of tuning fork 40 is determined in part by the effective mass of the tines 41, 42, adjustment of the size and hence mass of the metal films *50a*, *50b* permits fine adjustment of the tuning fork frequency. Metal film weights *50a*, *50b* typically are on the order of 1 micron thick, and thus may be characterized as "thick films." However, thick films *50a*, *50b* are not of the cermet type, but typically may be vacuum deposited.

As described below, the initial weight of thick films *50a*, *50b* preferably is slightly greater than that necessary for tuning fork 40 to resonate at the desired frequency. Subsequently, controlled portions of the thick films *50a*, *50b* may be removed, e.g., abrasively or by the use of laser evaporation, so as to reduce the mass to the exact amount needed for resonance at the desired frequency. Alternatively, the weight of films 50*a*, 50*b* may be increased by additional deposition of metal until the desired frequency is obtained. Thick films 50*a*, 50*b* preferably are placed at the free ends of tines 41, 42 as shown, since a change in mass at this location has the greatest effect on the frequency of the tuning fork. However, the weights could be placed elsewhere on the tines.

Another feature of microresonator 40 is the recesses 51 provided at the sides of stem 44. The shape and size of these recesses effects the Q of the resonator. Thus a short stemmed microresonator having recesses 51 (FIG. 4) may have a higher Q than a tuning fork not having such recesses. As noted earlier, however, high Q without the need for recesses 51 can be achieved using a stem which is longer than three times the tine width.

Figure 5:
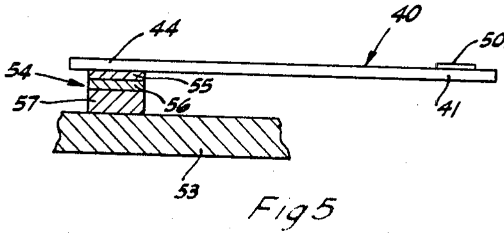
FIG. 5 is a transverse sectional view illustrating the manner in which the microresonator of FIG. 4 may be mounted by means of a eutectic pedestal.

The manner in which microresonator 40 may be mounted is illustrated in FIG. 5. Referring thereto, the stem portion 44 is attached to a substrate 53 by means of a eutectic pedestal 54. Pedestal 54 may include a gold layer 55 deposited atop or forming microresonator pad 48*a*, a silicon layer 56 and a gold layer 57 which may be unitary with or deposited upon substrate 53. When the three layers 55, 56 and 57 are heated, they fuse to form a solid pedestal firmly mounting microresonator 40 to the substrate 53. Since pedestal 54 is situated along a nodal line through stem 44, very little energy is lost through the mounting.

The mounting arrangement shown in FIG. 5 permits electrical connection to be made to electrode 48 directly via pedestal 54, eliminating the need for a separate electrical connection wire to pad 48*a*. In this regard, several isolated pedestals could be used, in a configuration like flip-chip bonding of integrated circuits, to provide independent electrical connection to various of the microresonator electrodes. On the other hand, use of a eutectic pedestal to mount microresonator 40 is by no means required; other mounting techniques may be employed. For example, the microresonator stem section 44 simply could be bonded to an appropriate pedestal using an epoxy resin or other appropriate adhesive or metal system.

Figure 6:
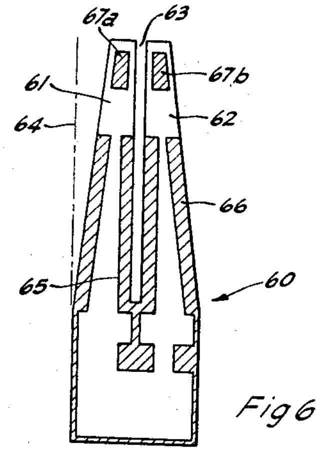
FIG. 6 is a top elevation view of a microresonator exhibiting very low temperature coefficient.

Microresonators with extremely low temperature coefficient can be obtained using the configuration of FIG. 6. As shown therein, a microresonator 60 includes tines 61, 62 separated by a very narrow slot 63. Tines 61, 62 are characterized by having a narrower width at the free ends than at the stem ends. For example, the tine outer edges 61*a* may be tapered at an angle of less than 10° with respect to a line 64 parallel to slot 63. Alternatively, only a portion of each tine outer edge adjacent the free end may be tapered with an angle greater than 10°, or the tines may be notched or stepped to achieve the narrower free end width. Tines 61, 62 include electrodes 65, 66 and thick film weights 67*a*, 67*b*.

The benefit of such tapering may be understood in conjunction with the following equation (1) which sets forth the approximate frequency $f$ of a tuning fork resonator:

$$f \simeq k\frac{w}{l^2}\sqrt{\frac{Y}{\rho}} \qquad (1)$$

wherein $k$ is a constant, $w$ is the width and $l$ is the length of a tine, $Y$ is the Young's modulus of the material from which microresonator 60 is fabricated, and $\rho$ is the density of the material.

Note that if the ambient temperature should increase, tines 61, 62 will expand, causing changes in both the width and length thereof. From equation (1) it is apparent that the length change has a greater effect on the frequency (due to the inverse square relationship between frequency $f$ and length $l$) than does the change in tine width. By making tines 61, 62 narrower at the free ends than at the stem, the change in width will have a greater proportionate effect on the frequency, thereby tending to compensate for the negative temperature coefficient associated with a change in length.

Moreover, the Young's modulus of tuning fork 60 can be controlled by appropriate crystallographic orientation of the material from which microresonator 60 is fashioned. For example, if quartz is employed, it is possible to use a 45° X cut with the tines 61, 62 oriented parallel to the Y axis of the crystal. However, since the Young's modulus differs as a function of crystallographic axis, a particular temperature coefficient value can be achieved by not using exactly a 45° X cut, but using quartz cut a selected few degrees away from this angle.

By judicious selection of crystalline orientation and the taper angle of tines 61, 62, a microresonator 60 with extremely low temperature coefficient can be achieved. For example, by using a crystal cut 5° away from a 45° X cut, a tine edge angle of 5° and dimensioned to have a tine length of 180 mils, a slot width of 4 mils and a tine width of 15 mils adjacent the stem, a resonator having a temperature coefficient of less than 5 parts per million for a 30° change in temperature can be obtained. The resonant frequency of such a microresonator is on the order of 25 kiloHertz.

Figure 7:
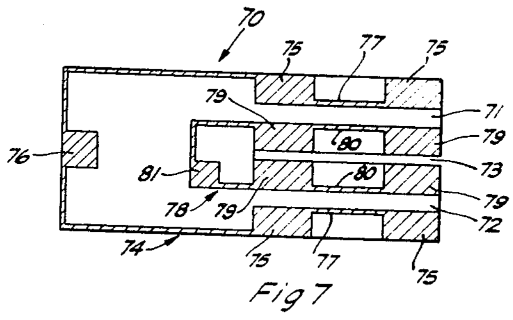
FIG. 7 is a top elevation view of a microresonator having segmented electrodes.

Referring now to FIG. 7, there is shown yet another embodiment of the invention, adapted for oscillation at an odd harmonic of the tuning fork fundamental frequency. To this end, a microresonator 70 includes tines 71, 72 separated by a slot 73. The outer edge of each tine 71, 72 is provided with a thin film electrode 74 having spaced electrode segments 75 connected to a pad 76 by narrow conductor strips 77. Another electrode 78 includes segments 79 spaced along the inner edges of tines 71, 72 adjacent slot 73. Segments 79 are electrically connected via narrow conductor strips 80 to a pad 81. Segments 75 and 79 are situated appropriately so as to produce a stress pattern typically exciting third or fifth harmonic oscillation. This stress pattern effectively will cancel any tendency of microresonator 70 to oscillate in other than the desired mode.

Microresonators in accordance with the present invention typically may be fabricated for quartz crystal, although any other piezoelectric or ferroelectric material such as lead zirconate titanate (PTZ) may be used. Each microresonator can be constructed using microlithographic techniques not unlike those used to make electronic integrated circuits. By way of example, a wafer of quartz having a thickness of from 1 mil to 3 mils initially may be polished and cleaned, then coated by evaporation onto both top and bottom surfaces with thin layers of chrome and gold. A layer of conventional photoresist next is provided atop the metal layers. The photoresist then is exposed through an appropriate photographic mask and developed so as to cause polymerization of the photoresist in the areas defining the microresonator. These polymerized areas act as a mask for selective etching of the chrome and gold films, which in turn act as a mask for etching of the quartz itself. The chrome and gold films then can be removed entirely, or selectively etched away through another photoresist mask to form the various electrodes. The thick film weights such as those designated 50*a*, 50*b* in FIG. 4, may be formed by vacuum deposition of metal onto the tine surface, followed by selective removal of excess material, as by laser evaporation, to achieve the desired mass and hence microresonator frequency.

Figure 8:
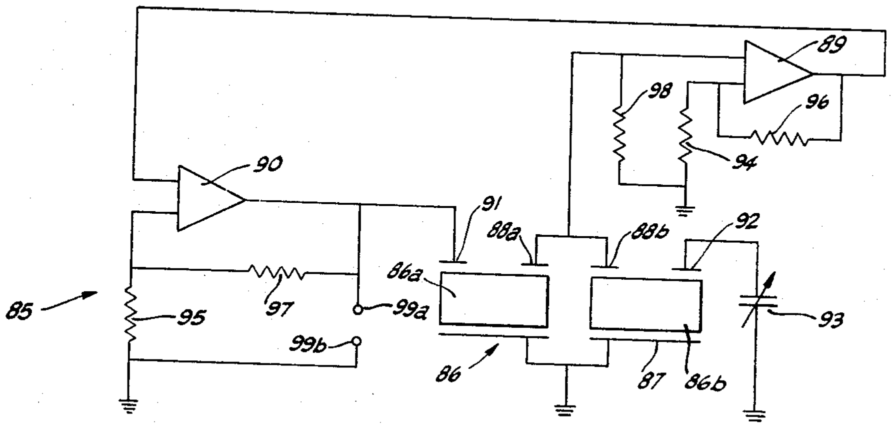
FIG. 8 is an electrical schematic diagram of a typical oscillator employing a microresonator in accordance with the present invention.

Referring now to FIG. 8, there is shown a typical oscillator circuit 85 using a microresonator 86 in accordance with the present invention. Microresonator 86 includes a reverse surface electrode 87 which is grounded, and tine inner edge electrodes 88*a*, 88*b* which are connected to the input of an operational amplifier 89. The output of amplifier 89 provides the input to a second operational amplifier 90 which in turn drives microresonator 86 via the outer electrode 91 on one tine 86*a*. The outer electrode 92 on the other tine 86*b* is connected to ground via a capacitor 93 which permits fine adjustment of the oscillation frequency. Resistors 94 and 95 set the gain, the resistors 96 and 97 provide negative feedback for respective amplifiers 89 and 90. The output signal from microresonator 86 is developed across a resistor 98. The oscillator 85 output appears across terminals 99*a* and 99*b*.

In operation, the electric field developed between electrodes 87 and 91 causes microresonator 86 to oscillate, producing an output signal between electrodes 87 and 88*a*, 88*8*. This output signal is amplified and shaped by amplifiers 89 and 90 and fed back to electrode 87 in appropriate phase relationship so as to drive the microresonator. The output obtained at terminals 99*a* and 99*b* will be sinusoidal and at a frequency established by microresonator 86. However, adjustment of capacitor 93 will permit fine tuning of the oscillation frequency, typically by as much as ± 200 parts per million.

Figure 9:
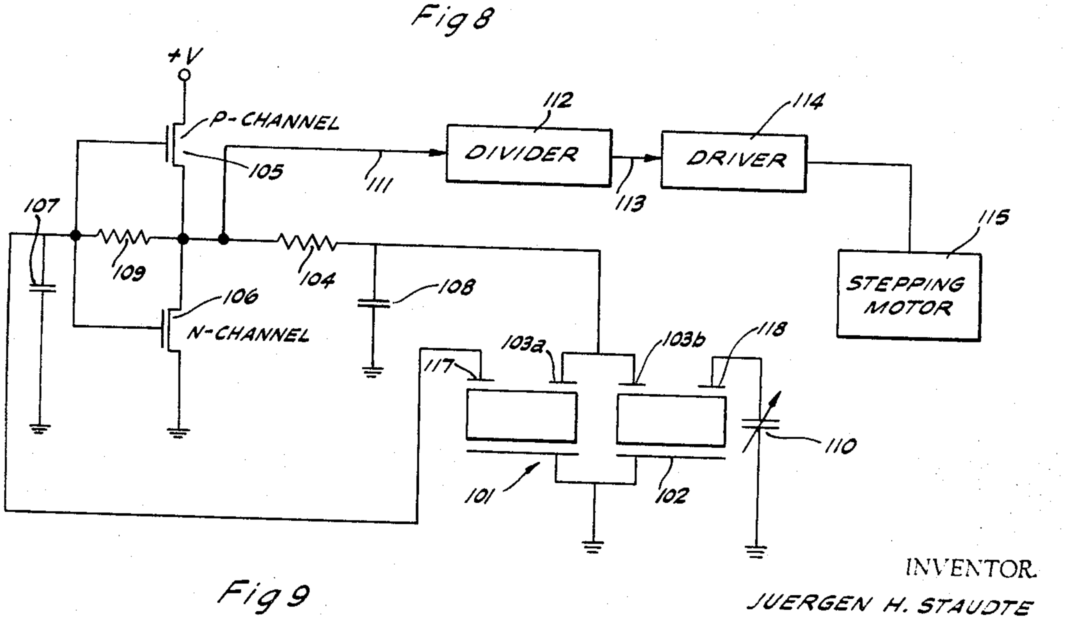
FIG. 9 is a diagram of another oscillator utilizing a microresonator and illustrating the manner in which the invention might be employed as a time standard in a wrist watch.

FIG. 9 shows a Pierce oscillator configuration useful for wrist watch applications. As evident therein, a microresonator 101 includes a grounded, reverse surface electrode 102 and tine inner edge electrodes 103*a*, 103*b* driven via a resistor 104 by a signal derived at the common connection of a pair of complementary metal oxide semiconductor (CMOS) transistors 105, 106. The microresonator output signal derived at tine outer edge electrode 117 is provided to the gates of both transistors 105, 106. Capacitors 107, 108, each of greater value than the effective capacitance of microresonator 101, shunt the input and output of the transistor circuit respectively. A relatively large resistance 109 provides feedback to obtain linear operation. A variable capacitor 110 permits fine tuning of the oscillator frequency, and is connected to outer tine electrode 118.

The electric field developed between electrodes 103*a*, 103*b* and electrode 102 causes oscillation of microresonator 101, producing an output signal at electrode 117. This signal is amplified by transistors 105, 106 and fed back to electrodes 103a, 103b in appropriate phase as to maintain oscillation.

The oscillator output is derived at line 111, and may be supplied to an appropriate divider circuit 112 to obtain a lower frequency signal on a line 113. In a very simple wrist watch configuration, the oscillator frequency and number of divider stages may be selected so as to produce a 1 pulse per second signal on line 113. This signal then may be amplified by a driver circuit 114 and supplied to a stepping motor 115 which mechanically advances the wrist watch hands. Capacitor 110 may be used for critical adjustment of the watch speed.

As an alternative, not shown, the divider output signal may be supplied to a coil cooperating with a magnet mounted on a conventional wrist watch balance wheel. In this way, the watch escape mechanism will be synchronized to the oscillator output.

Thus there are disclosed various microresonators of tuning fork configuration which are well suited for frequency source, filter, transducer or wrist watch time standard applications.

I claim:

1. A piezoelectric or ferroelectric microresonator of tuning fork configuration and having an overall length in the range of from about 100 mils to 500 mils, an overall width of from about 15 mils to 50 mils, and a thickness of less than about 3 mils, said microresonator having on the obverse surface thin film electrodes along the respective inner and outer edges of at least one tine and pads for attachment of electrical connection wires to said tine edge electrodes, said microresonator having on the reverse surface another thin film electrode extending across at least said one tine, and a pedestal for mounting the reverse surface of the microresonator stem to a substrate.

2. A microresonator according to claim 1 wherein the obverse surface includes a first thin film electrode along the outer edge of both tines and a second electrode along the inner edge of both tines, said other, reverse surface electrode extending across substantially the entire width of both tines.

3. A microresonator according to claim 2 further comprising, on the obverse surface of each tine, a third thin film electrode disposed between said inner and outer electrodes.

4. A microresonator according to claim 1 further comprising means for applying a driving signal between said reverse surface electrode and either an inner or outer electrode, an output signal being produced between said reverse surface electrode and another of said inner or outer electrodes.

5. A microresonator according to claim 1 further comprising a thick film metal weight disposed on each tine.

6. A microresonator according to claim 5 wherein the mass of said weights in controlled to adjust the resonant frequency of said microresonator to a preselected value.

7. A microresonator according to claim 6 wherein said mass is controlled by selective laser removal of portions of said thick film weights.

8. A microresonator according to claim 1 wherein the slot between said tines is in the range of from about 1 mil to 5 mils.

9. A microresonator according to claim 1 wherein the length of the tuning fork stem is at least three times the tine width.

10. A microresonator according to claim 1 wherein said pedestal comprises an epoxy resin.

11. A microresonator according to claim 1 wherein said pedestal is formed by alloying.

12. A microresonator according to claim 1 wherein electrical connection to said reverse surface electrode is made via said pedestal.

13. A microresonator according to claim 1 and fabricated microlithographically of quartz or lead zirconate titanate.

14. A microresonator according to claim 1 wherein said inner and outer edge electrodes each are segmented, segments of said electrodes being disposed to initiate oscillation of said microresonator in an odd harmonic mode.

15. A microresonator comprising a microminiature tuning fork of piezoelectric or ferroelectric quartz or leads zirconate titanate material, and having on the obverse surface a first substantially U-shaped thin metal film electrode extending along the outer edges of the tuning fork tines and a second substantially U-shaped thin metal film electrode extending along the inner edges of said tines adjacent the tuning fork slot, and having on the reverse surface a third thin metal film electrode extending substantially across both tines, thick film metal weights disposed on said tines adjacent the free ends thereof, said weights being dimensionally trimmed to establish the resonant frequency of said tuning fork.

16. A microresonator as defined in claim 15 wherein the length of the tuning fork stem is at least three times the tine width, and further comprising means for rigidly mounting one side of said stem to a support member.

17. A microresonator as defined in claim 15 having an overall length of between about 100 mils and 500 mils, an overall width of between about 15 mils and 50 mils, and a thickness of less than 3 mils, and formed by chemical etching of said material.

18. A microresonator according to claim 17 wherein said weights are formed by metal deposition, and wherein a portion of said deposited metal weights is removed by laser to establish the resonant frequency of said tuning fork.

19. A microresonator comprising a microminiature tuning fork of piezoelectric or ferroelectric material, and having on the obverse surface a first substantially U-shaped electrode extending along the outer edges of the tuning fork tines and a second substantially U-shaped electrode extending along the inner edges of said tines adjacent the tuning fork slot, and having on the reverse surface a third electrode extending substantially across both tines, further including means for rigidly mounting the stem of said tuning fork to a support member, said mounting means comprising a pedestal attached to the reverse surface of said tuning fork stem, electrical connection to said third electrode being via said pedestal.

20. A microresonator of tuning fork configuration and having low temperature coefficient, comprising a wafer of quartz situated within 10° of a 45° X cut and having a thickness in the range of from about 1 mil to 3 mils, the tines of said tuning fork being aligned substantially parallel to the Y axis of said quartz, the overall width of said microresonator being in the range of from about 15 mils to 50 mils.

21. A microresonator according to claim 20 further comprising thin film electrodes disposed on said tines and means for providing a driving signal to said electrodes, the resultant electric field produced in said tines initiating oscillation of said microresonator.

22. A microresonator according to claim 21 further comprising thick film metal weights disposed on said tines adjacent the free ends thereof.

23. A tuning fork:

a. fabricated of piezoelectric or ferroelectric material, and b. having no dimension greater than 500 mils, c. thin film electrodes disposed on each tuning fork tine, cooperating with d. means for providing a driving signal to said thin film electrodes thereby to provide an electric field in said tines, e. said material being oriented to produce motion of said tines toward or away from each other in response to said provided electric field, f. pedestal means for rigidly mounting the stem of said tuning fork to a supporting substrate, and g. thick film metal weights disposed on said tines adjacent the free ends thereof, said weights being dimensionally trimmed to establish the resonant frequency of said tuning fork.

24. A tuning fork according to claim 23 wherein the stem length is at least three times the tine width.

25. A wrist watch, the time standard of said watch comprising a tuning fork according to claim 23.

26. A tuning fork according to claim 23 wherein the obverse surface of each tine includes an electrode adjacent the inner tine edge and an electrode adjacent the outer tine edge, and wherein the reverse surface of each tine includes another electrode extending substantially across the width of each tine.

27. An oscillator circuit incorporating as the frequency source a tuning fork according to claim 26.

28. In combination, an oscillator circuit according to claim 27, and means for adjusting the oscillation frequency of said circuit, comprising a capacitor connected between said reverse surface electrode and one of the electrodes on said obverse surface.

29. An oscillator according to claim 27 comprising:

operational amplifier means for providing a driving signal to a first of said obverse surface electrodes, said operational amplifier means receiving an input derived from a second of said obverse surface electrodes, the phase shift of said means facilitating sustained oscillation of said tuning fork.

30. An oscillator according to claim 29 wherein said operational amplifier means comprises:

a first operational amplifier providing a driving signal to the outer edge electrode on one tine, and a second operational amplifier receiving a signal from the inner edge electrodes on said tines, the output of said second operational amplifier providing the input to said first operational amplifier.

31. An oscillator according to claim 30 wherein each operational amplifier is provided with negative feedback, and further comprising a variable capacitor connected between said reverse surface electrode and the outer edge electrode on the other tine, said capacitor facilitating frequency adjustment of said oscillator.

32. An oscillator according to claim 27 comprising:

complementary channel transistors connected in series across a source of voltage, means for driving the gates of said transistors with a signal obtained from a first of said obverse surface electrodes, and means for providing a driving signal obtained from the common connection of said series connected transistors to a second of said obverse surface electrodes.

33. A wrist watch comprising:

an oscillator according to claim 32, circuit means for dividing the frequency of the signal provided by said oscillator, and motor means for driving the hands of said watch in response to the divided frequency supplied by said circuit means.

34. A tuning fork according to claim 23 and having an overall length of from about 100 mils to about 500 mils, an overall width of from about 15 mils to about 50 mils, a thickness of less than about 3 mils and a slot width of from about 1 mil to 5 mils.

35. A tuning fork according to claim 34 and fabricated microlithographically.

* * * * *